E. MONTI.
PROCESS OF PREPARING STABLE, PREDIGESTED FOODS.
APPLICATION FILED OCT. 3, 1916.
1,416,372.
Patented May 16, 1922.
2 SHEETS—SHEET 1.
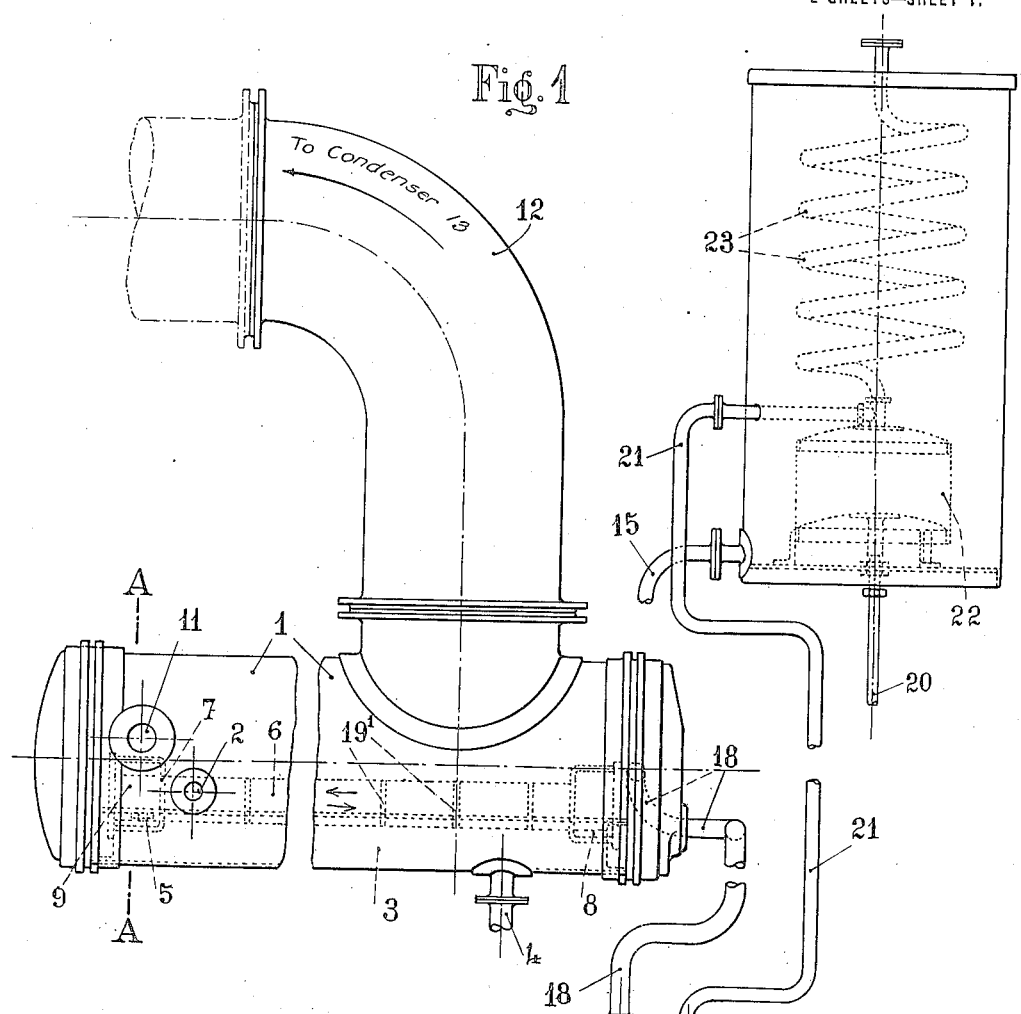
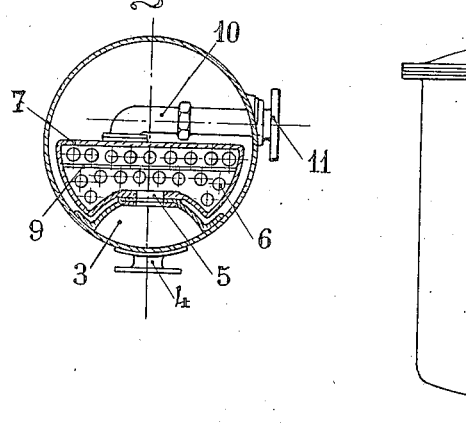

E. MONTI.
PROCESS OF PREPARING STABLE, PREDIGESTED FOODS.
APPLICATION FILED OCT. 3, 1916.
1,416,372.
Patented May 16, 1922.
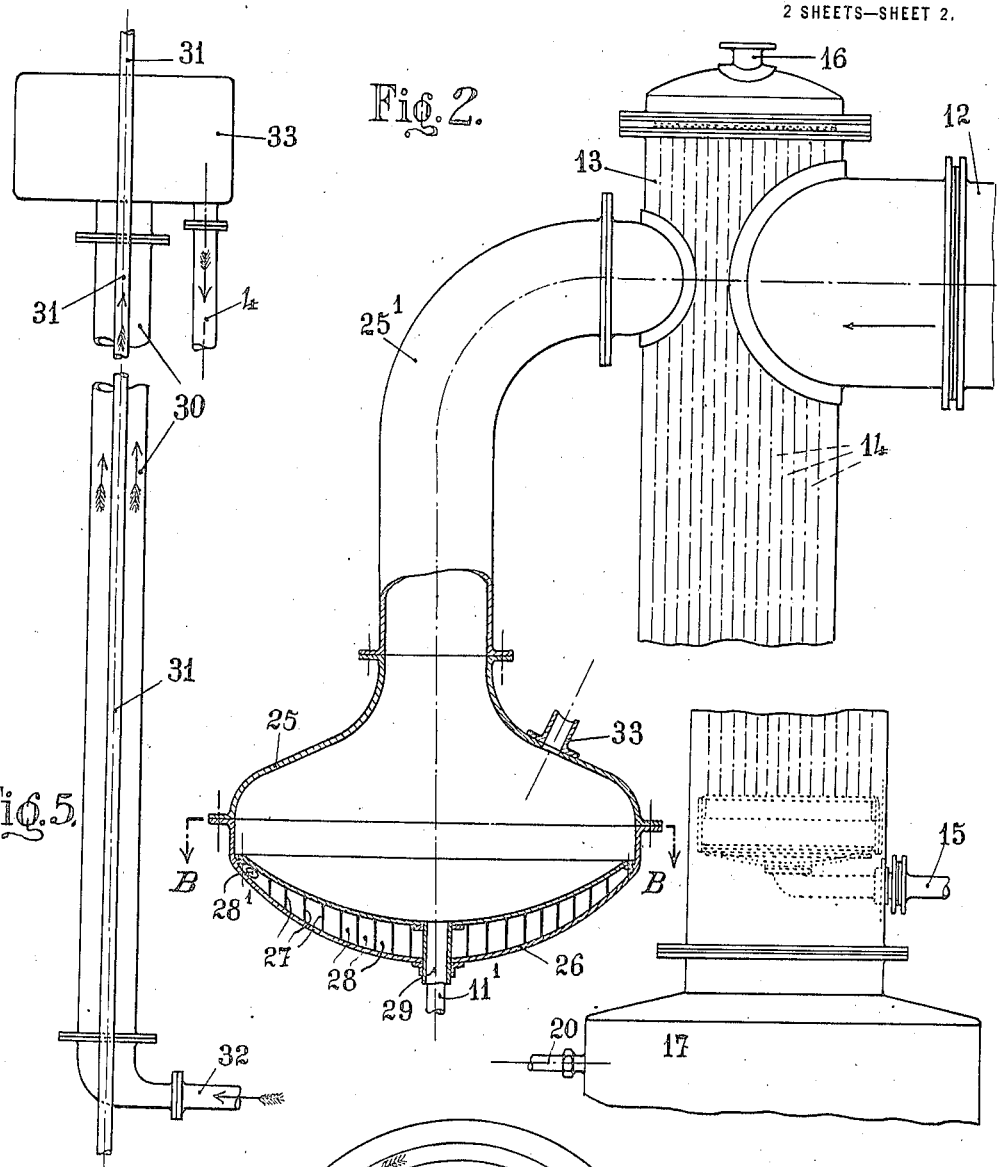
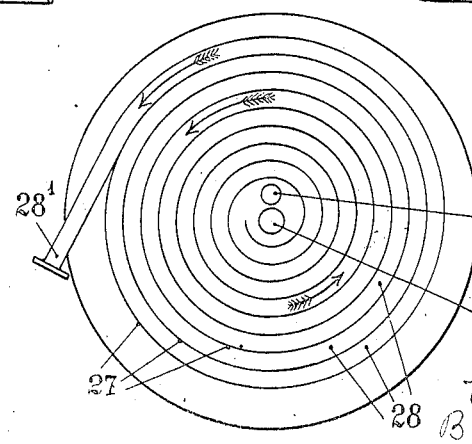

UNITED STATES PATENT OFFICE.

EUDO MONTI, OF TURIN, ITALY.

PROCESS OF PREPARING STABLE, PREDIGESTED FOODS.

1,416,372.  Specification of Letters Patent.  Patented May 16, 1922.

Application filed October 3, 1916. Serial No. 123,563.

*To all whom it may concern:*

Be it known that I, EUDO MONTI, subject of the King of Italy, residing at Turin, in the Kingdom of Italy, have invented certain new and useful Improvements in Process of Preparing Stable, Predigested Foods, of which the following is a specification.

The present invention relates to improvements in a process and apparatus for the preparation of concentrated and stable foods of excellent taste and easy digestion by treating alimentary substances, which are difficult to preserve and transport and are relatively cheap, with the residues of the wine, cheese and other industries.

According to my prior Patents N. 975290, 1065829 and especially N. 1,167,006 dated Jan. 4, 1916, I prepared concentrated and stable foods by causing the alimentary substances (eggs, milk, blood, etc.) to be digested in the juice of grapes or other acid fruits concentrated first by the freezing process and afterwards in my lukewarm water vacuum concentrator at a temperature nearly that of the human body until the product contains less than 35% water.

I have now found that the "enzyms", to which this phenomenon of digestion is due, are chiefly found in the parts of the grape and other fruits which adhere to the skin, so that the grape pomace extract (prepared according to the method described in the above mentioned patent) will be richer of enzyms than the grape juice; moreover I found that partially fermented whey will also predigest the protein and finally that the pomace treated with $SO_2$ (sulphurous anhydride) does not diminish its digestive power because under its action the enzyms are not destroyed or altered, while the sulphurous anhydride may be completely eliminated from the pomace during the process of concentration under a very low pressure in vacuum. I have ascertained also that the digestive efficiency of grape pomace extract is greater than that of grape juice, therefore much smaller quantities will suffice in order to obtain the same effect and therefore blood, milk, eggs and the like digested in grape pomace extract may contain higher percentages of protein than the similar products obtained from grape juice; also the acidity may be considerably reduced, the experience having taught me that proteids (blood, milk, eggs and the like) digested long enough at the temperature of the human body in a medium rich of special enzyms and the acidity of which does not exceed the equivalent of 1 gram tartaric acid (about ½ gram hydrochloric acid) in one thousand grams of the product taste much better and are more healthful than the similar products digested in a shorter time, at a higher temperature in the presence of an high percentage of free acids. Of course if the quantity of sugar contained in the grape pomace for each gram of free acid is too small, other sugar (preferably milk, grape or fruit sugar, also inverted saccharose or molasses may be added in order to sweeten and thicken the product, also to make it keep.

From the above facts I am able to apply my invention to a large number of industrial applications for the preparation of the said predigested concentrated and unalterable foods, substantially as described in my Patent N. 1,167,006 with the changes herein described.

I first sprinkle the grapes (also other berries) before picking them with a solution of one part of free $SO_2$ (sulphurous anhydride) in one hundred parts of water (the free $SO_2$ may of course if necessary be substituted with potash or soda sulphide or the like) in the very same way and using the same pumps and sprays used for sprinkling the grapes with copper solutions in order to prevent their destruction by the mildew. The grapes so treated if picked while still wet may be kept for some time and transported a considerable distance without altering. As soon as the grapes thus treated have reached the factory, I stem them quickly with a stemming and crushing apparatus, crush the grapes and separate as quickly as possible the juice from the peels and as far as possible also most of the seeds. I add then to the stemmed and partially seeded and pressed peels about 1 to 2% of their weight of the solution above described containing 1% free $SO_2$ I had sprayed on the grapes before picking them. The former spraying having destroyed almost all the germs adhering to the peels, this addition will be sufficient to prevent the fermentation of the pomace during the process of systematic exhaustion even if the pomace is not heated over 40° C. I proceed then to the systematic exhaustion or extraction of the stemmed and partially seeded peels in the way described in my above mentioned U. S. patent, the only difference being that I do not warm the water over 50° C. and even only to 40° C. if hot water might alter the flavour of some scented grapes. Also it is not necessary to warm the tanks provided they are kept in a warm room, so that the temperature of the pomace does not sink below 35° to 40° C. which is necessary in order to dissolve the tartar and the colouring matter.

The extract thus obtained is cooled in order to separate the tartar therefrom and then it passes to the freezing apparatus described in my U. S. Patent 1,065,829. I now dispose the scrapers in two series in the direction of the radius of the drums and secure the same on an upper shaft equally distant from each couple of cylinders by means of strong springs which may be regulated to press the scrapers on the drums strongly enough in order to detach the frozen solution therefrom, without producing an unnecessary friction. Said scrapers are constructed and secured in such a way as to form between each other a groove from which the half frozen solution falls into a tank consisting of a wire gauze through which the concentrated liquid falls and is raised by the pump in the same or in another freezing apparatus, while the snow is conveyed into the tanks where the systematic displacement of the soluble matters is effected in the way described in my U. S. patents for example 761387. This process may be used when it is possible to concentrate the extract previously by freezing, which would be very advantageous as the cold by sporifying the ferments makes the secretion of the enzyms easier. But the extract may be conveyed directly into the vacuum concentrator, in which it is evaporated by the quick circulation of hot water, till it reaches a density of 1250 to 1350 grams per liter.

The thawing through the ice will favour the secretion of enzyms or soluble ferments also separate the pectine and all colloids which will not pass through the semipermeable blade of ice crystals; it must therefore be avoided when the extract is intended for the preparation of jams or jellies, but it is very advantageous in all other cases because it improves very much the taste and flavour of the product as above said. The extract concentrated to a specific weight above 1250 grams per liter will keep without being sterilized even at a temperature of about 40° C.

Said extract stirred with five to ten times its weight of fresh blood, fresh milk, skimmed or centrifugated milk, eggs and the like will prevent their decay and allow me the time required to transport the mixture into a factory, where I can concentrate them in the way described in my above referred patents. If the mixture is to be kept for a considerable time, about one part of $SO_2$ in one thousand parts of the mixture will keep it for any length of time and the free $SO_2$ the presence of which is undesirable in the finished product will entirely evaporate during the digestion and concentration of the extract under an absolute pressure of but 30 to 40 mm. of mercury. Also the presence of a small percentage of alcohol will not prevent the predigestion and concentration of protein in grape pomace extract and also said alcohol will completely evaporate during the concentrating process. By adding to the blood digested and concentrated in the way above described till it contains less than 30% moisture from 10 to 20% toasted and ground cocoa nuts also some sugar and flavouring according to taste and drying the paste thus obtained in stamps in a stream of dry air at a temperature not exceeding 40° C. I obtain an excellent chocolate container 30% to 40% protein and 35 to 45% sugar whose feeding equivalent is therefore more than double its weight of good fresh meat, excellent in taste and keeping for any length of time in tin cans or glass pots and also in the open air wrapped in paper or tin. By mixing the paste above described with about its weight of toasted corn flour previously separated from the flinty part and from the bran and containing therefore about 10 to 15% of corn oil, and drying it in stamps I obtain tablets or cakes having the taste of chocolate and containing about 20% predigested protein 5% corn oil 25% sugar and 38% starch and other carbohydrates and 12% moisture excellent in taste and flavour and having the feeding equivalent of their weight of meat plus their weight of bread.

Figure 1 is an elevational view of the evaporator, juice collector, and water separator of the apparatus;

Figure 2 is a view partly in section of the digestor and condenser, forming part of the apparatus, the water collector and condenser shell being broken away to foreshorten the view;

Figure 3 is a horizontal section through the digestor on the line B—B of Figure 2;

Figure 4 is a sectional view on the line A—A of Figure 1; and

Figure 5 is a detail view of the water heater.

1 denotes the concentrator (the construction of which may be varied from that hereafter described provided that the conditions set forth and claimed in my U. S. Patent 973290 dated October 18, 1910 are fulfilled) in which the pomace extract previously treated with sulphurous anhydride and systematically exhausted according to my process is admitted through a tube fitted into a connection 2. The concentrated extract may be drawn out by means of an ordinary pump by connecting the tank with a discharge tube of suitable diameter and sufficiently high in order to balance wholly or partly the atmospheric pressure, so that the said extract may be caused to flow by using an ordinary pump situated at a lower floor of the factory or in the cellar to raise the liquid through a height of 5—6 meters; or even to flow naturally if the level of the cellar or lower story is over ten and a half meters beneath that of the concentrator.

This concentrator, as shown at Fig. 4, is provided with a double bottom 3 in which warm water circulates, this latter being admitted through the tube 4 and discharged through the opening 5 into the coil 6 placed on the bottom of the concentrator. This coil consists of two or more series of horizontal tubes, in which the water is compelled to circulate in opposite directions (as shown by the arrows of Fig. 1), and by two end collectors 7 and 8, the first of which is divided in two parts by the partition 9 in order to allow the said circulation of the water in the tubes and is connected, through the tube 10, with the outlet 11 of the water of the concentrator. A connection 12 connects the concentrator with the condenser 13, Fig. 2 in the interior of which is placed a bundle of tubes 14 in which the cold water coming through 15 and discharged through 16 circulates; the condensed water is discharged in the lower tank 17. The tube 18 serves to discharge the extract contained in the concentrator into the tank 19. The extract will pass through the vacuum concentrator in zig-zag, owing to the partitions $19^1$ (this preventing the formation on the bottom of layers of thick syrup) and will thus reach the right degree of concentration.

The required degree of vacuum is maintained in the condenser (and therefore also in the concentrator) and in the tanks 17 and 19 by means of the tubes 20 and 21 respectively, which open in the tank 22 connected by means of the coil tube 23 with a suitable pump (not shown in the drawing for the sake of simplicity). The tank 22 and the coil 23 are placed within the tank 24, in which I place the ice, which by melting will—through the tube 15 and by means of a suitable pump or in the like, will be caused to circulate in the coil of the condenser 13.

The pomace extract thus concentrated and deprived of any trace of sulphurous anhydride is mixed with the eggs, blood milk or whey (after having been concentrated in a concentrator of the same type, etc) and the mixture thus obtained is admitted through the tube 33 in the apparatus 25 provided with a double bottom 26, in which owing to the continuous wall 27 a spiral tube 28 is formed. In this latter the warm water coming from the concentrator at a temperature of about 50° to 60° C. is introduced through $11^1$ and caused to circulate quickly. 29 denotes the discharge tube of the end product. The required degree of vacuum is maintained in the digestor by the condenser 13 connected therewith through the tube $25^1$. In practice I will suitably employ a battery of concentrators and "digestors" connected in series or in parallel.

The concentrator and the digestor may be heated by the water issuing from the jacket of a gas or oil motor (which might be employed to drive the plant chiefly when this latter is connected with a freezing machine) or by the hot water coming from the surface condenser of a steam engine in accordance with the principle protected by my U. S. Patent 973290 dated October 18, 1910. This water however is conveyed to the lower part of a well insulated vertical tube 30 of large diameter and considerable height placed above the motor, in the interior of which runs the waste pipe of the hot gases coming from the gas or oil motor or the chimney of the furnace heating the water or steam boiler. The water coming from the engine through 32 is further heated by said gases passing through the tube 31 while it enters the tank 33 from which through the tube 4 (which of course is always well insulated) will reach first the concentrator and afterwards (following the way above described) the said water will pass into the digestor and from this latter, through the tube $28^1$ again into the jacket of the internal combustion motor (or in the condenser of the steam engine) or into the hot water furnace if no thermal engine is available in order to warm it.

When the vertical tube 30 is at least 15 to 20 meters high, there will be a considerable difference between the pressure of the water at the lower point of the tube 4 carrying the water into the concentrator and the lower point of the return pipe of said water; owing to this difference the heating water will circulate very quickly along the heating surfaces of the concentrator and digestor allowing thus to obtain a very high evaporation in said apparatus though the heating water is kept at a temperature lower than 70° C. as it is required in order to prevent the coagulation of the albumin near the surfaces of the coils and double bottoms (as it happens when the water reaches higher temperatures) and the formation on the said surfaces of a coating which acting as an insulator lessens rapidly the efficiency of the apparatus.

When it is not possible to have the tube 30 of the required height, I will employ a pump, which will increase the pressure and quicken the circulation of the heating liquid circulating in the interior of the apparatus to a speed of at least 10 meters per second.

Finally, when it is not possible to make use of any motor, a hot water furnace will be used for heating the water of the tube 30;

of course the hot discharge gases of the boiler or furnace will be caused to pass through the tube 31 and the water issuing from the digestor will go back to the boiler to resume its cycle.

In most cases it will be convenient to utilize the water coming from the tank also for systematically exhausting the pomace.

What I claim is:

1. The method of preparing digestive substances which comprises crushing the grapes or the like, separating the juice from the peels, adding to the fresh peels about one part of $SO_2$ in 1000 of water and afterward extracting the treated peels in a solvent at a temperature of about 40° C.

2. The method of preparing digestive substances which comprises spraying the grapes while still on the vines with a solution of $SO_2$ in water, picking and transporting the grapes to the factory, stemming, crushing and straining the same in ore to separate the juice from the pomace and the peels from the stems and seeds, treating the pomace, including the peels with about one part of $SO_2$ in 1000 parts of water and extracting the same at a temperature of about 40° C. in a solvent.

3. The method of preparing digestive substances which comprises spraying the grapes while still on the vines with a solution of $SO_2$ in water, picking and transporting the grapes to the factory, stemming, crushing and straining the same in ore to separate the juice from the pomace and the peels from the stems and seeds, treating the pomace, including the peels with about one part of $SO_2$ in 1000 parts of water, extracting the same at a temperature of about 40° C. in a solvent and concentrating the extract.

4. The method of preparing digestive substances which comprises spraying the grapes while still on the vines with a solution of $SO_2$ in water, picking and transporting the grapes to the factory, stemming, crushing and straining the same in ore to separate the juice from the pomace and the peels from the stems and seeds, treating the pomace, including the peels with about one part of $SO_2$ in 1000 parts of water, extracting the same at a temperature of about 40° C. in a solvent and concentrating the extract by evaporation at an absolute pressure of about 30 to 50 mm. of mercury.

5. The method of preparing stable, predigested foods, which comprises crushing and straining off the juice from grapes, treating the remaining pomace, including the peels with $SO_2$ in water, extracting the mass thus treated in water at about 40° C., concentrating the extract in vacuum, and treating the food with the concentrated extract.

In testimony whereof the foregoing specification is signed in the presence of two witnesses.

EUDO MONTI.

Witnesses.
 NORAH WHITESTONE,
 RINA REIJ.